EFFECT OF LIGAND CONCENTRATE ON THE REGENERATION OF CALCIUM LOADED AMBERLITE CG-50 RESIN — LIGAND 1,3 — CYCLOHEXANEDIONE IN METHANOL SOLUTION
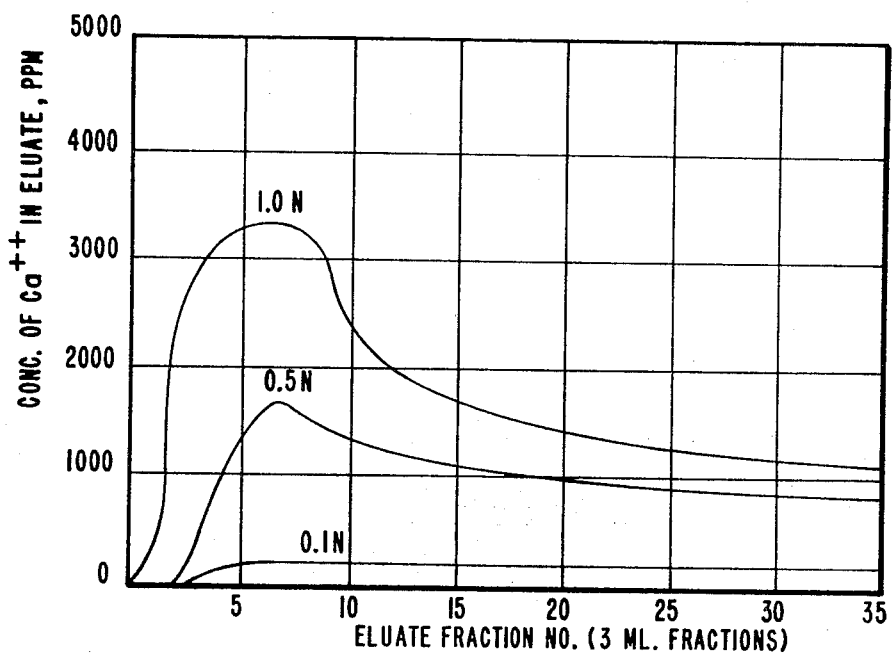
FIG.—1
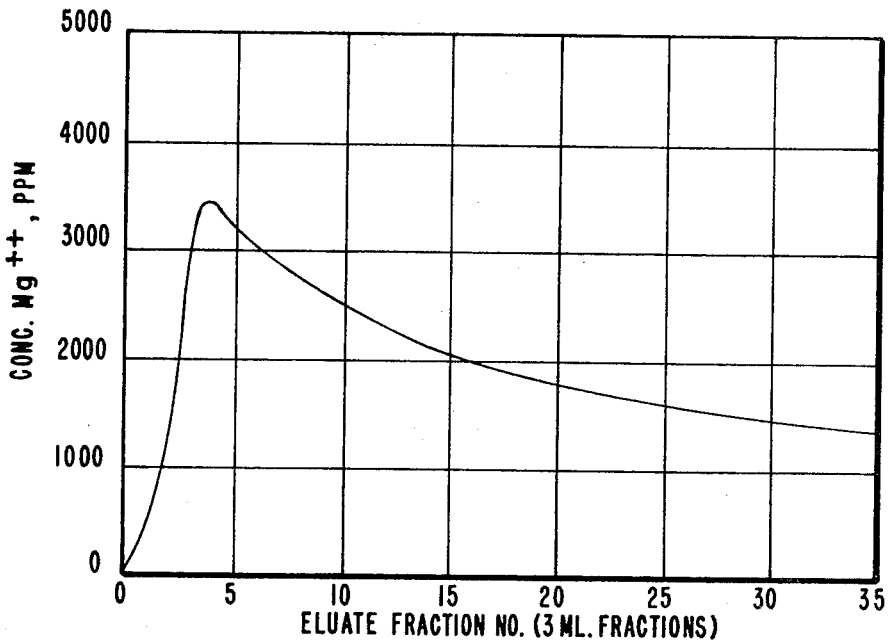
REGENERATION OF $Mg^{++}$ LOADED AMBERLITE CG-50 RESIN WITH 1.0 N 1,3 CYCLOHEXANEDIONE IN METHANOL SOLUTION
FIG.—2

3,658,729
REGENERATION OF ALKALINE EARTH LOADED CATIONIC EXCHANGE RESINS
David O. De Pree, Loomis, Herman H. Weyland, Folsom, and Marvin H. Gold, Sacramento, Calif., assignors to Aerojet-General Corporation, El Monte, Calif.
Filed Dec. 4, 1970, Ser. No. 95,251
Int. Cl. B01d *15/06;* C02b *1/76*
U.S. Cl. 260—2.2
7 Claims

ABSTRACT OF THE DISCLOSURE

A novel method for the regeneration of a weakly acidic ion exchange resin loaded with calcium or magnesium ions which comprises contacting said resin with a cycloaliphatic β-diketone in a water or organic solvent solution to remove said ions from said resin.

BACKGROUND OF THE INVENTION

The presence of alkaline earth metal ions in industrial waste streams represents a substantial source of pollution because of their strongly basic nature which can substantially alter the pH of a lake, river or stream. Industrial waste streams containing such ions can be substantially freed thereof by the use of resins to remove calcium and magnesium ions. However, if such treatment is to be practiced on a large scale and on a continuous basis, it is necessary to regenerate the resin in a simple way. Various approaches to the regeneration problem have been proposed. None of them have provided a completely adequate answer to this critical problem. The present invention is concerned with the provision of a surprisingly effective way of regenerating these resins to remove the calcium and magnesium ions.

SUMMARY OF THE INVENTION

Briefly, the present invention comprises a novel method for the regeneration of a moderately or weakly acidic ion exchange resin loaded with calcium or magnesium ions which comprises contacting said resin with a cycloaliphatic β-diketone in a water or organic solvent solution to remove said ions from said resins. Preferably, the cycloaliphatic β-diketone is used in the form of a solution which is from about 0.1 to 1.0 N.

It is an object of the present invention to provide a novel method for the regeneration of weakly acidic ion exchange resins.

More specifically it is an object of the present invention to provide a novel method for the regeneration of weakly acidic ion exchange resins loaded with calcium or magnesium ions.

It is a specific object of the present invention to regenerate weakly acidic ion exchange resins of the polymethacrylic acid type.

Another particular object of the invention is the use of cycloaliphatic β-diketones as the ligand to capture the calcium and magnesium ions.

These and other objects and advantages of this invention will be apparent from the more detailed description which follows.

DESCRIPTION OF THE PREFERRED EMBODIMENTS

The present invention is generally applicable to cation exchange materials, preferably weakly acidic cation materials such as B10–REX 63 (moderately acidic, phosphonic acid, polystyrene type), Amberlite CG–50 (weakly acidic, carboxylic acid, polymethacrylic type) and Chelex-100 (a very weakly acidic, iminodiacetic acid, polystyrene type).

The present invention can be applied to the invention disclosed in assignees' concurrently filed United States patent application Ser. No. 95,286, filed Dec. 4, 1970, for either the pretreatment of gypsum waters to remove the scaling and fouling calcium and magnesium ions from feed streams to ion exchange, reverse osmosis, electrodialysis or flash distillation water desalination plants. The process of the above-mentioned concurrently filed application together with the alkaline earth technology may also be used as a total demineralization process for gypsum water.

A synthetic gypsum water simulating the composition expected from the impoundment of neutralized acid mine effluent was prepared. The composition was based on neutralization with lime of an acid mine effluent with a pH of 2.4 and a composition of 205 p.p.m. Fe, 20 p.p.m. Al, 10 p.p.m. Mn, 27 p.p.m. Mg, 95 p.p.m. Ca and 1200 p.p.m. sulfate. It is assumed that this effluent has been neutralized to a pH of 7 with lime and the iron, aluminum and manganese have settled out. To prepare this solution 1.576 g. of anhydrous calcium sulfate and 0.119 g. of magnesium sulfate heptahydrate were dissolved in deionized water and the solution diluted with deionized water to one liter. Analysis of this synthetic gypsum water for magnesium, calcium and sulfur by emission spectroscopy indicated the following composition.

| | P.p.m. |
|---|---|
| Mg | 25 |
| Ca | 384 |
| $SO_4^-$ | 1260 |

The following examples are presented solely to illustrate the invention and should not be regarded as limiting in any way. In the examples, the parts and percentages are by weight unless otherwise indicated.

EXAMPLE I

A total of 4 g. of AG3–X4 resin (polyamine type resin, chloride form, Bio-Rad Laboratories), dry weight, was suspended in 500 ml. of 0.5 N NaOH and agitated for three hours to convert the resin to the OH− form. The resin was separated by filtration using a sintered glass filter washed with 2000 ml. methanol and allowed to dry. The dried AG–3X resin (OH− form) was thoroughly mixed with 2.5 g. of CG–50 cation exchange resin (polymethacrylic acid type H+ form, Malinkroet). The mixed resin was slurried in a ~40 ml. of the synthetic gypsum water and charged to a 12″ x ⅜″ glass chromatographic column. The column was placed in an assembly containing an automatic fraction collector using a 10 ml. automatic syphon pipette to collect 10 ml. fractions of eluate. An additional 160 ml. of the synthetic gypsum water was passed through the column. This constituted a total of 200 ml. including the initial 40 ml. used in charging the resin to the column. Ten ml. fractions of eluate were collected and fractions 1, 5, 10, 15 and 20 analyzed by emission spectroscopy for calcium, magnesium and sulfur. The results obtained were as follows:

| | Conc. ions found, p.p.m. | | |
|---|---|---|---|
| Eluate fraction No. | Calcium | Magnesium | Sulfur |
| 1 | 19 | 3.5 | 80 |
| 5 | <5 | <2 | 70 |
| 10 | <5 | <2 | 50 |
| 15 | <5 | <2 | 75 |
| 20 | 6 | <2 | 60 |

The analysis for sulfur concentrations by this method were not very precise below 100 p.p.m., however, these values indicate a very low sulfate concentration. These data show that the mixed bed resin has removed essentially all of the calcium and magnesium sulfates from the gypsum water. Because of the small quantities of material employed in the experiment, it was not possible to use some of the more standard engineering methods for separation of the resins. The resins instead were separated by their difference in density and particle size using a sedimentation technique. The finely divided, less dense anionic exchange resin is yellow in color and could easily be identified when contrasted with the coarser, more dense white cationic exchange resin. The resins were removed from the column, slurried in water and allowed to separate by sedimentation in a ½" x 3' column having a removable section 6" long at the base fitted with a removable fritted disc. The resins settled with the yellow anionic resin on top and the more dense white cationic resin on the bottom. The water was drawn off through the fritted disc, the disc removed and the plug of resin pressed out of the bottom section of the column with a plunger. The resin plug was sliced into three portions, white cationic exchange resin, yellow anionic exchange resin and approximately one gram of the interface where some mixing had occurred. The white spent cationic exchange resin was slurried in water, charged to a ¼" x 9" chromatographic column and eluted with 50 ml. of a 2 N solution of 1,3-cyclohexanedione in methanol. This solution was prepared by dissolving 11.2 g. of 1,3-cyclohexanedione in methanol and diluting to 50 ml. Three ml. fractions of eluate were collected. Analysis of the eluate fractions by emission spectroscopy gave the following results, indicating efficient regeneration of the cationic resin by exchange of the ligand hydrogen for the cation on the resin.

| Fraction No. | Metal ion conc. in chelate regenerant sol., p.p.m. | |
|---|---|---|
| | Calcium | Magnesium |
| 1 | <10 | <2 |
| 2 | <10 | <2 |
| 3 | 228 | 74 |
| 4 | 492 | 146 |
| 5 | 492 | 146 |
| 6 | 420 | 112 |
| 9 | 480 | 52 |
| 12 | 523 | 55 |
| 15 | 810 | 70 |

The column was washed with additional methanol (~20 ml.) and additional eluate fractions taken. Fraction 23 was found to contain less than 10 p.p.m. calcium and 2 p.p.m. magnesium. The yellow spent anionic exchange resin was slurried in water, charged to a ¼" x 9" chromatographic column and eluted with 100 ml. of a 2 N solution of 2-aminoethanol in methanol. This solution was prepared by dissolving 12.2 g. of 2-aminoethanol in methanol and diluting to 100 ml. with methanol. Three ml. fractions of eluate were collected. Analysis of the eluate fractions for sulfur by emission spectroscopy gave the following results indicating efficient regeneration of the anionic exchange resin.

| Fraction No.— | Sulfur conc., p.p.m. |
|---|---|
| 1 | <50 |
| 2 | <50 |
| 3 | 5,200 |
| 4 | [1] 18,000 |
| 5 | 5,900 |
| 6 | 3,500 |
| 7 | 1,700 |
| 10 | 320 |
| 15 | 100 |

[1] Equal to 54,000 p.p.m. $SO_4^-$.

Because the solution from this experiment was fairly dilute in cation and had some excess chelating agent present, it was decided to precipitate the carbonates using ammonium carbonate to provide pH adjustment. Fractions 13, 14 and 15 (2 ml. each after removal of samples for analysis) were combined and treated with a saturated water solution of ammonium carbonate. Precipitation of a fine dense white solid occurred almost immediately. The white precipitate was separated by centrifugation, washed with water and then with methanol and dried. The metal carbonate precipitate was found to weigh 0.0261 g. The regenerated ligand solution containing excess ammonium carbonate was degassed under vacuum to remove $CO_2$ and excess ammonia and then passed through 3 grams (dry weight) of Dowex 50–X8 cationic resin (strongly acidic, polystyrene type). The pH of the solution changed from basic to acidic indicating the exchange of the chelate ammonium ion for the hydrogen ion of the resin. The chelate solution had thus been regenerated for recycle. The ammonium loaded cationic exchange resin was washed with methanol, dried and then heated to 100° C. at which temperature $NH_3$ was evolved as indicated by odor and a basic indication of the vapors with moist pH paper. This temperature is within the upper range of stability for polystyrene type resins as indicated by the resin manufacturers. The metal carbonate precipitate from above was suspended in eluate fraction 4 of the anionic regenerant stream (2 ml. remaining after analysis for sulfur). The mixture was heated and both a fine white precipitate and a flocculent precipitate formed. No gas was evolved. The supernated liquid was decanted and the precipitates washed with methanol and heated. The flocculent ppt. decomposed giving off $CO_2$ as indicated by passing the evolved gas through barium hydroxide solution to form a white precipitate. A small amount of liquid by-product formed from the thermal decomposition. This by-product was identified as the free amine by its odor. A residue of calcium sulfate remained. The sulfate ion was identified by the chloranilate test.

EXAMPLE II

A polymethacrylic acid type ion exchange resin sold commercially as Amberlite CG–50 resin was loaded with calcium and magnesium ions by contact with the above described synthetic mine water. The loaded resin was then treated with a methanol solution of 1,3-cyclohexanedione. The results are shown in FIGS. 1 and 2 of the drawings.

The present invention is also applicable to the regeneration of the loaded resin using an aqueous solution of a cycloaliphatic β-diketone. This result is demonstrated by the following example:

EXAMPLE III

A water swollen resin bed was charged to the ⅜" x 120" column. The bed contained 0.2 g. of magnesium loaded Amberlite CG–50 resin (10.5 meq. mg./g. dry resin) and 2.45 g. of calcium loaded Amberlite CG–50 resin (4.0 meq. $Ca^{++}$/g. of dry resin). This gives a ratio of mg./Ca of 25 p.p.m. mg./384 p.p.m. Ca which corresponds to that calculated for a typical neutralized acid mine impoundment in the Appalachian area. The water swollen resin was eluted with 100 ml. of an ≈1.0 N solution of 1,3-cyclohexanedione which was prepared in the following manner: 11.2 g. of 1,3-cyclohexanedione was dissolved in 100 ml. of deionized water. The eluate from the use of this solution to treat the loaded CG–50 resin was collected in 3 ml. fractions and analyzed by flame photometry for $Ca^{++}$ and $Mg^{++}$. Calcium ion was determined at a wave length of 622 μm. and the instrument Beckman DK–2 spectrophotometer adjusted to give a response of 100 units for a 100 p.p.m. standard solution.

Analysis for magnesium was made at a wave length of 383 μm. and the instrument adjusted for 50 units for a 100 p.p.m. standard. The organic moiety in the solution (1,3-cyclohexanedione) seemed to contribute a background response only in the case of magnesium and this amounted to ~240–250 p.p.m. This effect disappeared at dilution of over 10/1.

|  | Calcium | | | Magnesium | | |
| --- | --- | --- | --- | --- | --- | --- |
| Fraction No. | Reading | Dilution factor | Average, p.p.m. | Reading | Dilution factor | Average, p.p.m. |
| 1 | 7 | 1 | 7 | 0 | 1 | 0 |
| 2 | 49 | 4 | 196 | 12 | 1 | 24 |
| 3 | 58 | 40 | 2,320 | 53 | 8 | 848 |
| 4 | 90 | 40 | 3,600 | 45 | 20 | 1,800 |
| 5 | 94 | 40 | 3,760 | 74 | 10 | 1,480 |
| 6 | 86 | 40 | 3,440 | 75 | 10 | 1,400 |
| 7 | 93 | 40 | 3,720 | 37 | 10 | 740 |
| 8 | | | | | | |
| 9 | 95 | 40 | 3,800 | 10 | 10 | 200 |
| 10 | | | | | | |
| 11 | 83 | 40 | 3,320 | 34 | 10 | 680 |
| 12 | 59 | 40 | 2,360 | 100 | 2 | 400−240=160 |
| 13 | | | | | | |
| 14 | 51 | 40 | 2,040 | 71 | 2 | 284−240=44 |
| 15 | 64 | 20 | 1,280 | 77 | 2 | 308−240=68 |
| 16 | | | | | | |
| 17 | | | | | | |
| 18 | 35 | 10 | 350 | 64 | 2 | 256−240=16 |
| 19 | | | | | | |
| 20 | | | | | | |
| 21 | | | | | | |
| 22 | | | | | | |
| 23 | 23 | 4 | 92 | 72 | 2 | 288−240=48 |
| 24 | | | | | | |
| 25 | | | | | | |
| 26 | 90 | 1 | 90 | 58 | 2 | 232−240=0 |

The present invention is applicable to cycloaliphatic β-diketones such as 1,3-cyclohexanedione, 1,3-cyclopentanedione, and methy, ethyl and other alkyl-substituted cycloaliphatic β-diketones. The cycloaliphatic β-diketones can be used in a wide variety of solvents such as water, methanol, ethanol, propanol, polyols, polyethers and the like.

These data show that the cation exchange resin is very efficiently regenerated with a water solution of 1,3-cyclohexanedione. Since calcium and magnesium carbonates are very water insoluble, the precipitation of the carbonates after pH adjustment occurs almost quantitatively as from the wet alcohol solution.

Amberlite CG–50 resin is polymethacrylic acid. It is manufactured by Rohm & Haas Co., Philadelphia. The particular grade used in the examples was supplied by Mallenckrodt Chemical Works and was analytical reagent grade, 100–200 mesh particle size with a total exchange capacity of 10.0 meq./g.

Having fully described the invention, it is intended that it be limited only by the lawful scope of the appended claims.

We claim:

1. A method for the regeneration of a moderately or weakly acidic ion exchange resin loaded with calcium or magnesium ions which comprises contacting said resin with a cycloaliphatic β-diketone in a water or organic solvent solution to remove said ions from said resin.

2. A method for the regeneration of a weakly acidic ion exchange resin loaded with calcium or magnesium ions which comprises contacting said resin with a cycloaliphatic β-diketone in a water solution to remove said ions from said resin.

3. A method for the regeneration of a weakly acidic ion exchange resin loaded with calcium or magnesium ions which comprises contacting said resin with a cycloaliphatic β-diketone in an organic solvent solution to remove said ions from said resin.

4. A method for the regeneration of a weakly acidic ion exchange resin loaded with calcium or magnesium ions which comprises contacting said resin with a cycloaliphatic β-diketone in a methanol solution to remove said ions from said resin.

5. A method for the regeneration of a polymethacrylic ion exchange resin loaded with calcium or magnesium ions which comprises contacting said resin with a cycloaliphatic β-diketone in a water or organic solution to remove said ions from said resin.

6. The method of claim 1 wherein the cycloaliphatic β-diketone is 1,3-cyclohexanedione.

7. The method of claim 1 wherein the cycloaliphatic β-diketone is present in an amount sufficient to provide a 0.1 N or 1.0 N solution.

References Cited

UNITED STATES PATENTS 3,454,503  7/1969  Blankenhorn et al.
3,536,637  10/1970  Noll et al.

FOREIGN PATENTS 1,286,252  1/1969  Germany.

MELVIN GOLDSTEIN, Primary Examiner

U.S. Cl. X.R.

210—30